July 19, 1927.
P. H. DAVEY
1,636,293
POWER CONNECTING DEVICE
Filed June 21, 1926
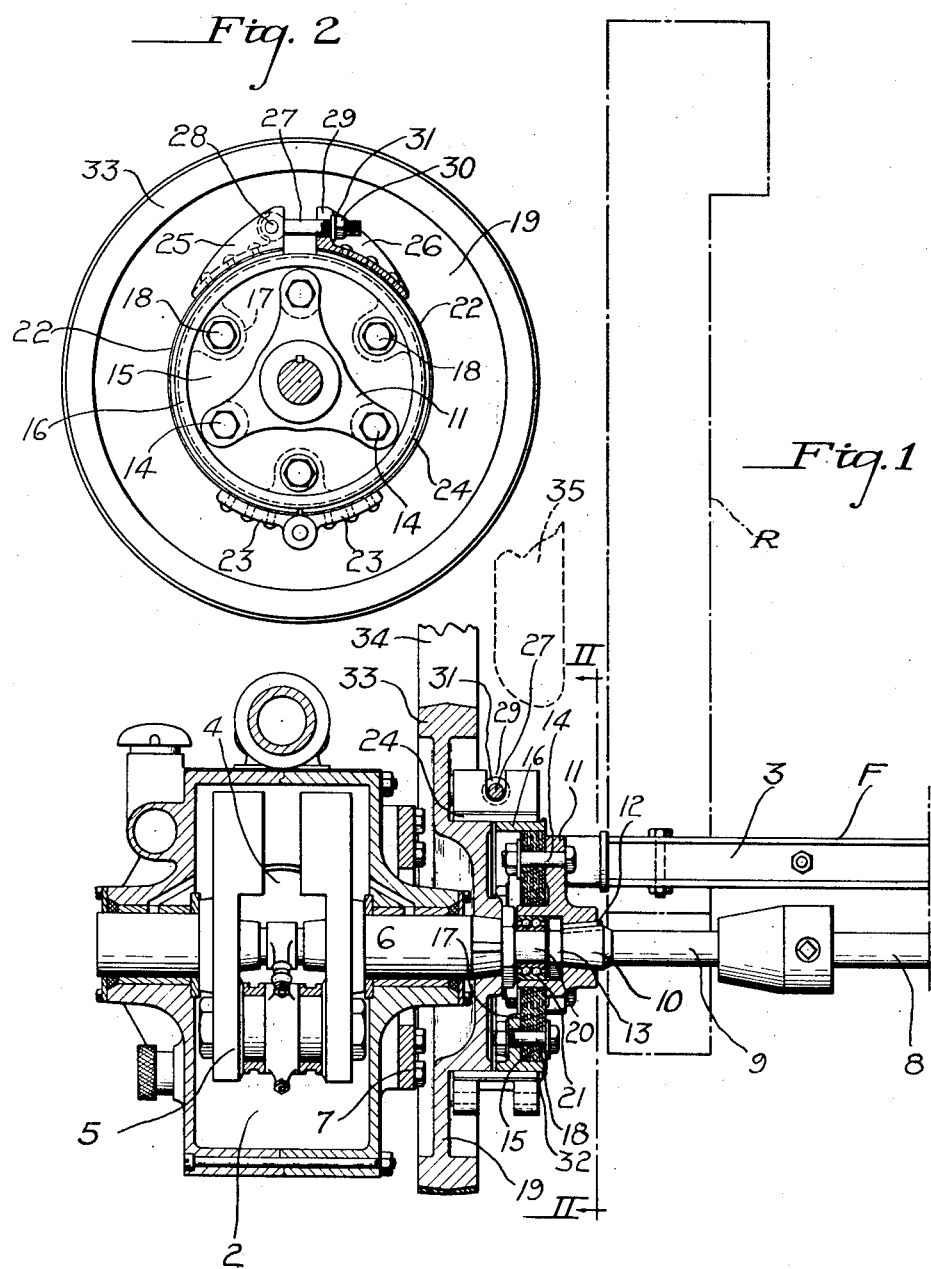
INVENTOR
Paul H. Davey Patented July 19, 1927.

1,636,293

UNITED STATES PATENT OFFICE.

PAUL H. DAVEY, OF KENT, OHIO, ASSIGNOR OF ONE-HALF TO JAMES A. G. DAVEY, OF SOUND BEACH, CONNECTICUT.

POWER CONNECTING DEVICE.

Application filed June 21, 1926. Serial No. 117,649.

This invention relates to power connecting devices, and is shown herein as being applied to an air compressor mounted on the front of an automobile vehicle, although the invention has numerous other applications.

The driving of an air compressor or other power consuming device from an engine is likely to cause many practical difficulties, and this is particularly true where a power connection is to be made to the engine of an automotive vehicle. I have found from exhaustive tests that unless some flexible and yieldable means are provided in the driving connection between the automobile engine and an air compressor driven thereby, the drive shaft will break sooner or later. It is also necessary to provide a connection in the nature of a clutch connection so that the power consuming device may be connected or disconnected from the engine at will.

I therefore provide a driving connection wherein the driving and the driven shafts are placed in substantially coaxial relationship and mount a drum member on each of these shafts. I further provide a bodily removable clamping band adapted to surround the drum members so as to operatively connect the shafts. Preferably one of the drum members is flexibly connected to its shaft and this is most conveniently done by attaching a spider to the shaft, connecting a yieldable disk, made of layers of fabric impregnated by rubber, to the spider and then attaching the drum member proper to this yieldable disk.

The above described arrangement is effective for removing a large number of the shocks incident to the driving of an apparatus such as an air compressor. These shocks may be further reduced by so forming one of the drum members that it acts as a flywheel. This flywheel may also be used as a driving pulley for operating a fan which is preferably employed with an air compressor, or it may be used for driving other devices.

In the accompanying drawings which illustrate the present preferred embodiment of my invention as applied to the driving of an air compressor from the engine of an automotive vehicle, Figure 1 is a vertical section through an air compressor, and the front portion of an automotive vehicle, showing my improved driving connection; and Figure 2 is a vertical section taken on the line II—II of Figure 1.

In the illustrated embodiment of my invention, there is shown an air compressor indicated generally by the reference character 2, which is mounted on extension members 3 secured in the frame F of an automotive vehicle. The radiator R of the vehicle is indicated in chain lines.

The air compressor comprises a pair of opposed cylinders 4 having pistons and connecting rods which are operatively connected to a crank 5 on a shaft 6. The compressor is provided with a frame member 7 which is connected to extension members 3 and so designed as to bring the shaft 6 into substantial alignment with the forward extension 8 of the crank shaft of the automobile engine (not shown).

Instead of the hand crank attachment which is usually secured to the end of the crank shaft 8, I provide a shaft extension 9 which is secured to the crank shaft in a suitable manner and projects through the opening generally placed below the radiator proper, and through the radiator shell, for accommodating the hand crank.

The shaft 9 is provided with a tapering portion 10 at its front end and a spider 11 is secured to this tapering portion by a key 12 and a nut 13.

Bolts 14 are provided in each arm of the spider 11 and these bolts pass through a flexible disk 15. The disk 15 is preferably made of a number of layers of fabric impregnated with rubber.

A rim member 16 is also secured to the flexible disk 15. For purposes of connection it is provided with lugs 17 which are secured to the disk by bolts 18, and as best shown in Figure 2, the lugs 17 lie intermediate the arms of the spider 11.

The shaft 6 is provided with a tapered portion over which is fitted a drum member 19, the drum member being secured by a key and nut as shown. Preferably the shaft 6 is also provided with an extension 20 which fits into a ball bearing 21 mounted in the spider 11.

In order to secure the drum members together I provide a bodily removable clamping band. This band preferably comprises a plurality of arcuate sections 22 secured together by hinge members 23. The sections 22 are preferably somewhat flexible and are provided with a suitable lining 24 having a certain amount of yieldability. Brake band lining has been found very satisfactory.

The free ends of the clamping band are provided with members 25 and 26 for suitably clamping the band around the drum members. The member 25 carries a bolt 27 which is hinged on a pin 28, and the member 26 is provided with a slot 29 into which the bolt may fit. A nut 30 and washer 31 are also provided. When the automotive vehicle is being moved from place to place the clamping band is bodily removed. When it is desired to operate the air compressor, the clamping band is placed around the drum members, the hinge bolt 27 is placed in the slot 29 and the nut 30 is tightened until the outer faces of the drum members are firmly gripped. The compressor may then be operated indefinitely. It is found that the above described arrangement is highly satisfactory in practice. Twisting or weaving of the frame F does not disturb the connection and the device may be operated for hours at a time without interruption. A flange 32 is provided on the rim member 16 for preventing the band from working off in operation. The clearance between the drum members permits of a certain amount of misalignment without injury and the bearing 21 is preferably of such type that it will not bind, if by any chance the shafts 6 and 8 do get slightly out of alignment.

The drum member 19 is provided with a rim 33 which acts as a flywheel and thus aids in reducing the shock load on the drive shaft. If desired, the outer face of this rim may be crowned to accommodate a drive belt 34 for operating a cooling fan 35 adapted to supply a blast of air through the radiator R and thus keep the engine cool.

I have illustrated and described a preferred form of my invention, but it will be understood that it will not be limited to this form, as it may be otherwise embodied within the scope of the following claims:

I claim:—

1. The combination of a driving shaft, a drven shaft normally alined therewith, a flexible torque-cushioning disk permitting limited misalinement of said shafts, separate drums on said shafts, and a clamping band adapted to encircle said drums said band tending to correct any misalinement of said drums and being movable out of operating contact with said drums.

2. In a driving connection for use in a gas compressor drive having a compressor shaft and an engine shaft normally alined with said compressor shaft, the combination with separate drums on said shafts of a clamping band adapted to encircle said drums for clamping them together in alinement with each other, said band being movable out of operative contact with said drums, means for positively forcing the band into clamping relation with said drums, and a flexible torque-cushioning coupling between one of the drums and its shaft.

3. A driving connection, comprising a driving shaft, a driven shaft, a pair of drum members connected to the shafts and a bodily removable clamping band adapted to surround the drum members and thus connect the shafts, one of the drum members comprising a spider attached to the shaft, a rim member and a yieldable connecting disk attached to the spider and the rim members.

4. In a driving connection for use in a gas compressor drive having a compressor shaft and an engine shaft normally alined with said compressor shaft, the combination with separate drums on said shafts of a bodily removable band adapted to encircle said drums for clamping them together, and a flexible disk of resilient material arranged to permit limited misalinement of said shafts.

5. In a driving connection for use in a gas compressor drive including an engine shaft and a compressor shaft normally alined with said engine shaft, the combination with separate drums on said shafts of a bodily removable band adapted to encircle said drums for clamping them together and a yieldable coupling arranged to permit limited misalinement of said shafts.

6. The combination of a driving shaft, a driven shaft normally alined therewith, a flexible coupling permitting limited misalinement of said shafts, separate drums on said shafts, and a bodily removable clamping band adapted to encircle said drums said band tending to correct any misalinement of said drums.

7. The combination of a driving shaft, a driven shaft normally alined therewith, a flexible disk coupling permitting limited misalinement of said shafts, separate drums on said shafts, and a bodily removable clamping band adapted to encircle said drums said band tending to correct any misalinement of said drums.

8. A device as in claim 7, the flexible disk being of resilient material for cushioning the torque of the drive.

In testimony whereof I have hereunto set my hand.

PAUL H. DAVEY.